United States Patent
Kurabayashi

(10) Patent No.: US 10,293,254 B2
(45) Date of Patent: May 21, 2019

(54) INFORMATION PROCESSING SYSTEM, SERVER, PROGRAM, AND INFORMATION PROCESSING METHOD

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 149 days.

(21) Appl. No.: 15/627,023

(22) Filed: Jun. 19, 2017

(65) Prior Publication Data

US 2017/0282072 A1      Oct. 5, 2017

Related U.S. Application Data

(63) Continuation of application No. PCT/JP2015/080692, filed on Oct. 30, 2015.

(30) Foreign Application Priority Data

Dec. 19, 2014    (JP) .................................. 2014-256988

(51) Int. Cl.
*A63F 13/497*    (2014.01)
*A63F 13/35*    (2014.01)
(Continued)

(52) U.S. Cl.
CPC ............ *A63F 13/497* (2014.09); *A63F 13/35* (2014.09); *A63F 13/85* (2014.09); *A63F 13/533* (2014.09);
(Continued)

(58) Field of Classification Search
CPC ........ A63F 13/497; A63F 13/35; A63F 13/85; A63F 13/533; A63F 13/79; A63F 2300/308; A63F 2300/535
(Continued)

(56) References Cited

U.S. PATENT DOCUMENTS

| 6,699,127 | B1 * | 3/2004 | Lobb ...................... A63F 13/10 345/418 |
| 2009/0093314 | A1 * | 4/2009 | Ichikawa ................ A63F 13/10 463/43 |

(Continued)

FOREIGN PATENT DOCUMENTS

| JP | 2001-224860 A | 8/2001 |
| JP | 2010-239990 A | 10/2010 |

(Continued)

OTHER PUBLICATIONS

International Search Report issued in Application No. PCT/JP2015/080692, dated Jan. 19, 2016 (2 pages).

(Continued)

*Primary Examiner* — Allen Chan
(74) *Attorney, Agent, or Firm* — Osha Liang LLP

(57) ABSTRACT

It is an object of the present invention to continuously and effectively motivate players playing a game to create and upload play-videos. At a server 1, an event obtaining unit 11 obtains log data of a demand-invoking event that has been processed as being negative in the game from a terminal 2-1, etc. on which the demand-invoking event has occurred. The event obtaining unit 11 obtains log data of a possible supply event that has been processed as being positive in the game from a terminal 2-2 on which the possible supply event has occurred. A demand-level calculating unit 13 selects demand-invoking events related to the possible supply event from one or more demand-invoking events on the basis of the individual log data obtained and calculates the level of potential demand on the basis of the result of selection. A play-video-recording-recommendation notification unit 14 issues a notification to the terminal 2-2 on which a possible supply event having a demand level satisfying a predeter-
(Continued)

mined condition has occurred to prompt recording of a play-video of the possible supply event.

10 Claims, 4 Drawing Sheets

(51) Int. Cl.
  *A63F 13/85* (2014.01)
  *A63F 13/533* (2014.01)
  *A63F 13/79* (2014.01)
(52) U.S. Cl.
  CPC ......... *A63F 13/79* (2014.09); *A63F 2300/308* (2013.01); *A63F 2300/535* (2013.01)
(58) Field of Classification Search
  USPC .......................................................... 463/31
  See application file for complete search history.

(56) References Cited

U.S. PATENT DOCUMENTS

| | | |
|---|---|---|
| 2014/0094302 A1 | 4/2014 | Wilkiewicz et al. |
| 2014/0228112 A1 | 8/2014 | Laakkonen et al. |
| 2016/0250551 A1 | 9/2016 | Suzuki et al. |

FOREIGN PATENT DOCUMENTS

| | | |
|---|---|---|
| JP | 2011-512172 A | 4/2011 |
| JP | 5521104 B1 | 6/2014 |
| WO | 2009/094611 A2 | 7/2009 |

OTHER PUBLICATIONS

Written Opinion issued in Application No. PCT/JP2015/080692, dated Jan. 19, 2016 (3 page).

* cited by examiner

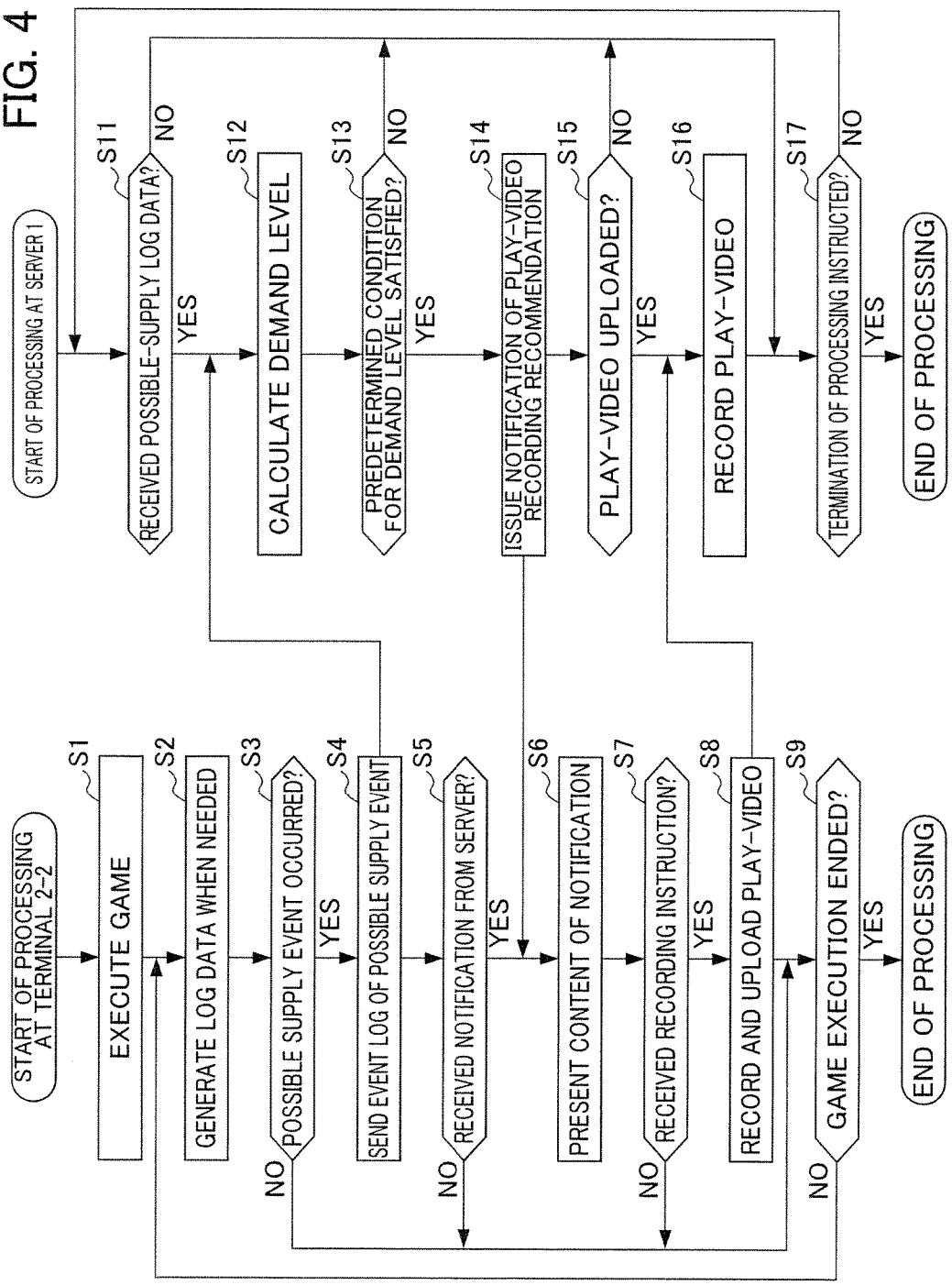

INFORMATION PROCESSING SYSTEM, SERVER, PROGRAM, AND INFORMATION PROCESSING METHOD

TECHNICAL FIELD

The present invention relates to an information processing system, a server, a program, and an information processing method.

BACKGROUND ART

Recently, in order to share game experience on terminals such as smartphones among players, a large number of video data created by recording game screens during play have been uploaded on the Internet (see Patent Literatures 1 and 2). An environment for this purpose is being established, and many development tools for recording such video data are being provided.

Generally, video data generated by recording game screens during play are often called "play-videos." In addition to such video data, there is also another type of video data, which is generated by capturing video of a player together with how a game was played. Generally, such video data is called "Let's Play." Hereinafter, however, these types of video data, including "Let's Play," will be collectively referred to as "play-videos." That is, in this specification, "play-videos" are a broad concept meaning images presenting how a certain game was played.

It is expected that many games incorporating toolkits that support creation of play-videos will appear in the future. It is predicted that many play-videos in this case will be created by capturing interesting plays, beautiful plays, plays in which a player elegantly beats a boss, etc. in a pin-point fashion, rather than by capturing the game screen during the entire play time. It is presumable that, when a large number of such pin-point play-videos are uploaded, a cycle of sharing and viewing play-videos will be established and, as a result, games having the above-described kind of play-video creating function will become popular.

Patent Document 1: Specification of United States Patent Application, Publication No. 2014/0094302
Patent Document 2: Specification of United States Patent Application, Publication No. 2014/0228112

DISCLOSURE OF THE INVENTION

Problems to be Solved by the Invention

With existing technologies, including Patent Literatures 1 and 2, however, it is not easy to create play-videos needed by other players in a pin-point fashion. Thus, it is anticipated that a large volume of play-videos that are seldom viewed will be accumulated, which hinders the establishment of a cycle of sharing and viewing play-videos. Accordingly, there is a demand for a new scheme for assisting casual players (users) to readily create play-videos of high quality, i.e., play-videos needed by other players.

The present invention has been made in view of the situation described above, and it is an object thereof to continuously and effectively motivate players playing a game to create and upload play-videos.

Means for Solving the Problems

In order to achieve the above object, an information processing system according to an aspect of the present invention is an information processing system including a plurality of terminals that can execute a game and also including a server, wherein the server includes: an event obtaining unit that obtains log data of each first event, processed as being negative in the game, from a terminal at which the first event has occurred among the plurality of terminals and that obtains log data of each second event, processed as being positive in the game, from a terminal at which the second event has occurred among the plurality of terminals; a level calculating unit that selects a first event or events related to each second event from one or more first events on the basis of the individual log data obtained and that calculates a level of potential demand for an image related to the second event on the basis of the result of selection; and a notifying unit that issues a notification to each terminal at which a second event whose demand level satisfies a predetermined condition has occurred to prompt recording of a video related to the second event, wherein at least one or more of the plurality of terminals include: an event detecting unit that detects first events and second events while the game is being executed; a log providing unit that provides the server with individual log data of the first events and second events; and a presenting unit that presents the content of the notification from the server.

This makes it possible to continuously and effectively motivate players playing the game to create and upload play-videos.

A server according to an aspect of the present invention is a server that communicates with a plurality of terminals that can execute a game, the server including: an event obtaining unit that obtains log data of each first event, processed as being negative in the game, from a terminal at which the first event has occurred among the plurality of terminals and that obtains log data of each second event, processed as being positive in the game, from a terminal at which the second event has occurred among the plurality of terminals; a level calculating unit that selects a first event or events related to each second event from one or more first events on the basis of the individual log data obtained and that calculates a level of potential demand for a video related to the second event on the basis of the result of selection; and a notifying unit that issues a notification to each terminal at which a second event whose demand level satisfies a predetermined condition has occurred to prompt recording of a video related to the second event.

This makes it possible to continuously and effectively motivate players playing the game to create and upload play-videos.

Furthermore, the log data may include one or more kinds of attribute information that is obtained while the game is being executed, the level calculating unit may calculate correlation between the log data of the second event and each of the log data of the first events, and the level calculating unit may select a first event or events having log data with the correlation satisfying a predetermined condition as a first event or events related to the second event.

This makes it possible to suitably calculate the level of potential demand. Accordingly, it becomes possible to issue more suitable notifications for continuously and effectively motivating players to create and upload play-videos.

Furthermore, the log data may include log data representing a progress status of the game and log data representing a player's status in the game.

This makes it possible to notify a player executing the game that there is viewing demand from other players related to the progress status in the game or the status of the player. Accordingly, it becomes possible to suitably motivate the player to upload the play-video data.

Furthermore, the log data may be represented by a vector in a multidimensional vector space, and the level calculating unit may calculate, as the correlation, the distance in the multidimensional space between a vector representing the log data of the second event and each of vectors representing the log data of the one or more first events.

This makes it possible to calculate the level of potential demand even more suitably. Accordingly, it becomes possible to issue more suitable notifications for continuously and effectively motivating players to create and upload play-videos.

Furthermore, the level calculating means may increase the level of potential demand for a video related to the second event as the number of first events selected as being related to the second event increases.

This makes it possible to calculate the level of potential demand even more suitably. Accordingly, it becomes possible to issue more suitable notifications for continuously and effectively motivating players to create and upload play-videos.

Furthermore, the server may further include a management means that manages video or videos related to certain events of the game executed in the past or location data of the video or videos, the level calculating means may obtain the number of accesses to video or videos related to the second event among the video or videos managed by the management means or the video or videos identified on the basis of the location data, and the level calculating means may decrease the level of potential demand for a video related to the second event as the number of accesses increases.

This makes it possible to calculate the level of potential demand even more suitably. Accordingly, it becomes possible to issue more suitable notifications for continuously and effectively motivating players to create and upload play-videos.

A non-transitory computer readable medium storing a first program according to an aspect of the present invention is an information processing method corresponding to the above-described server according to the one aspect of the present invention.

A non-transitory computer readable medium storing a second program according to an aspect of the present invention is a program executed by a computer that controls a terminal in the above-described information processing system according to the one aspect of the present invention. Specifically, the program causes a computer that controls a terminal that communicates with a server to execute control processing, the server having: an event obtaining function of obtaining log data of each first event, processed as being negative in the game, from a terminal at which the first event has occurred among the plurality of terminals and obtaining log data of each second event, processed as being positive in the game, from a terminal at which the second event has occurred among the plurality of terminals; a notifying function of selecting a first event or events related to each second event from one or more first events on the basis of the individual log data obtained, calculating a level of potential demand for an image related to the second event on the basis of the result of selection, and issuing a notification to each terminal at which a second event whose demand level satisfies a predetermined condition has occurred to prompt recording of video data related to the second event, and the control processing including: an event detecting step of detecting first events and second events while the game is being executed; a log providing step of providing the server with individual log data of the first events and second events; and a presenting step of presenting the content of the notification from the server.

This makes it possible to continuously and effectively motivate players playing the game to create and upload play-videos.

An information processing method corresponding to the above-described second program according to the one aspect of the present invention is also provided as an information processing method according to an aspect of the present invention.

Effects of the Invention

According to the present invention, it is possible to continuously and effectively motivate players playing a game to create and upload play-videos. Furthermore, it is possible to encourage players playing a game to create and upload play-videos needed by other players, thereby realizing a cycle for quickly satisfying demand for play-videos.

BRIEF DESCRIPTION OF THE DRAWINGS

FIG. 4 is a flowchart showing recording recommendation processing executed by the information processing system in FIG. 1.

PREFERRED MODE FOR CARRYING OUT THE INVENTION

An embodiment of the present invention will be described below with reference to the drawings.

It is to be understood that what are simply referred to as "images" hereinafter should be construed to include both "moving images" and "still images." Furthermore, "moving images" should be construed to include images that are displayed individually through the following first processing to third processing. First processing refers to processing for displaying a series of still images, while continuously switching among them as time passes, for individual actions of objects (e.g., game characters) in planar images (2D images). Specifically, two-dimensional animation, i.e., processing similar to what is called book flipping, is an example of first processing. Second processing refers to processing for presetting motions corresponding to individual actions of objects (e.g., game characters) in stereoscopic images (images based on 3D models) and displaying the objects while changing the motions as time passes. Specifically, three-dimensional animation is an example of second processing. Third processing refers to processing for preparing videos (i.e., moving images) corresponding to individual actions of objects (e.g., game characters) and rendering the videos as time passes.

Figure 1:
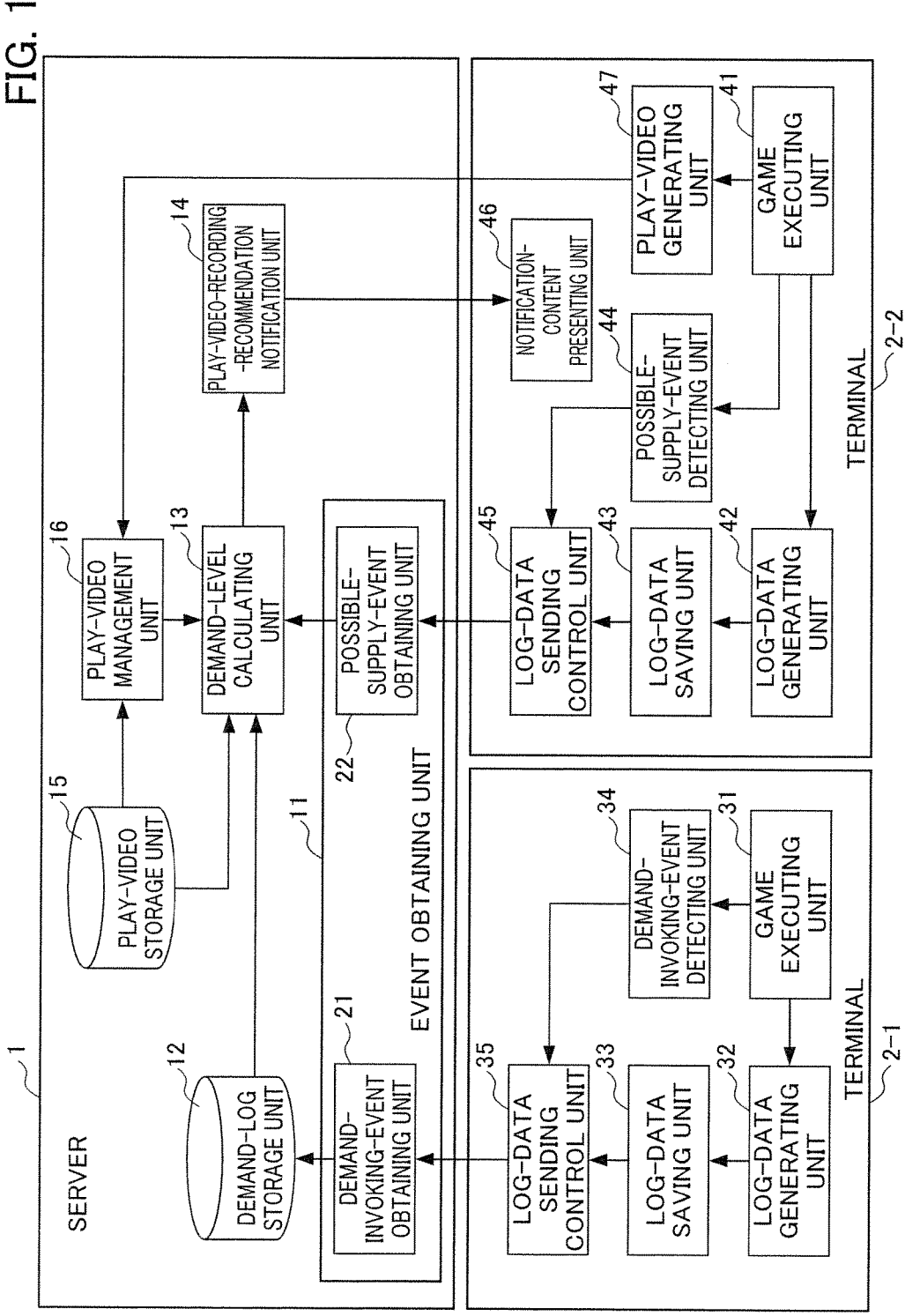
FIG. 1 is a functional block diagram showing the functional configuration of an information processing system according to an embodiment of the present invention.

FIG. 1 shows the configuration of an information processing system according to an embodiment of the present invention. The information processing system shown in FIG.

1 is configured by individually connecting a server 1 and terminals 2-1 and 2-2 to each other via a predetermined network, such as the Internet, which is not shown. In FIG. 1, only two terminals 2-1 and 2-2 are shown for ease of explanation of the present invention. In practice, a large number of terminals may be connected to the server 1 in the information processing system.

Each of the server 1 and the terminals 2-1 and 2-2 in this embodiment is applied to a computer and peripheral devices thereof. The individual units in this embodiment are implemented by hardware provided in computers and peripheral devices thereof, as well as by software for controlling the hardware.

The hardware includes a CPU (Central Processing Unit) that serves as a control unit, and also includes a storage unit, a communication unit, a display unit, and an input unit. Examples of the storage unit include a memory (RAM: Random Access Memory, ROM: Read Only Memory, etc.), an HDD (Hard Disk Drive), and an optical disk (CD: Compact Disk, DVD: Digital Versatile Disk, etc.) drive. Examples of the communication unit include various types of wired and wireless interface devices. Examples of the display unit include various types of displays, such as a liquid crystal display. Examples of the input unit include a keyboard and a pointing device (a mouse, a trackball, etc.).

Each of the terminals 2-1 and 2-2 in this embodiment is implemented as a smartphone and is provided with a touchscreen that serves as both an input unit and a display unit. For example, the input unit of the touchscreen is constituted of capacitive or resistive position input sensors that are stacked in the display area of the display unit, which detect the coordinates of a position at which a touch operation is performed. The touch operation here refers to bringing something (a user's finger, a stylus, etc.) into contact with or in proximity to the touchscreen (more specifically, the input unit thereof) serving as a display medium. Hereinafter, a position at which a touch operation is performed will be referred to as a "touched position," and the coordinates of the touched position will be referred to as "touched coordinates."

Furthermore, the software includes computer programs and data for controlling the hardware. The computer programs and data are stored in the storage unit and are executed or referred to as appropriate by the control unit. Furthermore, the computer programs and data can be distributed either via a communication line or as recorded on a computer-readable medium, such as a CD-ROM.

Each of the server 1 and the terminals 2-1 and 2-2 has a functional configuration shown in FIG. 1 in order to enable various operations through cooperation between the hardware and software described above.

The server 1 includes an event obtaining unit 11, a demand-log storage unit 12, a demand-level calculating unit 13, a play-video-recording-recommendation notification unit 14, a play-video storage unit 15, and a play-video management unit 16.

The event obtaining unit 11 obtains log data of a first event, which is processed as being negative in a certain game, from a terminal at which the first event (the terminal 2-1 in the example in FIG. 1) has occurred among the plurality of terminals (the terminals 2-1 and 2-2 in the example in FIG. 1). Furthermore, the event obtaining unit 11 obtains log data of a second event, which is processed as being positive in the game, from a terminal at which the second event (the terminal 2-2 in the example in FIG. 1) has occurred among the plurality of terminals.

Here, it is assumed that the game involves a plurality of events. Furthermore, it is assumed that at least some of the plurality of events are processed selectively as being positive or negative in accordance with players' operations, etc. "Positive" and "negative" here mean a pair of mutually opposite concepts. That is, it suffices that a pair of mutually opposite kinds of processing are executed selectively in accordance with players' operations, and there is no particular limitation as to the specific nature of the processing, etc.

For example, first events, which are processed as being negative, include events that are processed as failure situations in the game. Specific examples of first events include game overs, failures to acquire rare items, failures to ally with NPCs (Non-Player Characters), and failures to find story branch points. First events, described above, may be recognized as a type of event with which there is a high possibility that a player who has experienced it wishes to view a play-video related to the first event (e.g., a play-video created by another player and presenting a process resulting in being processed as a successful situation). Thus, first events, described above, will hereinafter be called "demand-invoking events."

On the other hand, for example, second events, which are processed as being positive, include events that are processed as successful situations in the game. Specific examples of second events include stage clearings, successes in acquiring rare items, successes in allying with NPCs, and successes in finding story branch points. Second events, described above, are a type of event with which there is a high possibility of satisfying demand from other players when a play-video related to the second event (e.g., a play-video presenting a process resulting in being processed as a successful situation) is posted. Thus, second events, described above, will hereinafter be referred to as "possible supply events."

Furthermore, log data here refers to data representing a history of situations, etc. in the game, which vary as time passes. That is, what is referred to as log data herein is not static data whose content is the same regardless of the acquisition timing but is dynamic data (real-time data) whose content varies depending on the acquisition timing. For example, in this embodiment, log data is data constituted of a set of an arbitrary number of arbitrary kinds of elements representing attribute information in the game. Furthermore, in this embodiment, log data includes log data representing a progress status in the game and log data representing a status of a player in the game. That is, log data of a demand-invoking event is history data representing the game progress status and the player's status at the time when a player experienced the demand-invoking event. On the other hand, log data of a possible supply event is history data representing the game progress status and the player's status at the time when a player experienced the possible supply event.

Hereinafter, for simplicity of explanation, it is assumed that a demand-invoking event occurs at the terminal 2-1 and a possible supply event occurs at the terminal 2-2. That is, in the example in FIG. 1, of the components of the event obtaining unit 11, a demand-invoking-event obtaining unit 21 obtains log data of a demand-invoking event that has occurred at the terminal 2-1; on the other hand, a possible-supply-event obtaining unit 22 obtains log data of a possible supply event that has occurred at the terminal 2-2. It goes without saying, however, that both demand-invoking events and possible supply events may occur at any terminal on which the game is being executed (including the terminals 2-1 and 2-2).

Here, in a terminal that sends log data of a demand-invoking event (the terminal 2-1 in the example in FIG. 1) to the server 1 described above, a game executing unit 31, a log-data generating unit 32, a log-data saving unit 33, a demand-invoking-event detecting unit 34, and a log-data sending control unit 35 function, as shown in FIG. 1.

The game executing unit 31 executes a predetermined game. The log-data generating unit 32 generates log data when needed while the predetermined game is being executed. The log-data saving unit 33 saves the log data generated when needed, as described above. That is, the game progress status and the player's status vary as time passes, and log data representing the game progress status and the player's status is obtained and saved when needed (in real time). The demand-invoking-event detecting unit 34 detects the occurrence of a demand-invoking event. The log-data sending control unit 35 executes control for sending, to the server 1, log data generated at certain timing while the game is being executed. In this embodiment, the certain timing is the timing at which a demand-invoking event is detected by the demand-invoking-event detecting unit 34. That is, in this embodiment, although log data is generated in real time when needed, the log data is not constantly sent to the server 1 but is sent only when a demand-invoking event is detected as log data of the demand-invoking event.

The demand-log storage unit 12 stores such log data of demand-invoking events, transmitted from various terminals, including the terminal 2-1.

Here, there are cases where certain events in the game become demand-invoking events for some players but not (become possible supply events) for other players. That is, the number of players for which an event becomes a demand-invoking event varies among various kinds of events in the game. For example, in the case of an event that is difficult to clear, it is anticipated that the number of players for which the event becomes a demand-invoking event will be large. Thus, log data of demand-invoking events may be stored in the demand-log storage unit 12 for each of various kinds of events in the game. Furthermore, when considered from the viewpoint of a single kind of event, log data of a plurality of demand-invoking events about individual players who experienced that kind of event in various situations may be stored in the demand-log storage unit 12.

The demand-level calculating unit 13, on the basis of the log data of a possible supply event obtained by the possible-supply-event obtaining unit 22 and the log data of a plurality of demand-invoking events stored in the demand-log storage unit 12, selects one or more demand-invoking events related to the possible supply event. Then, on the basis of the result of selection, the demand-level calculating unit 13 calculates the level of potential demand for a play-video of the possible supply event (hereinafter referred to as the "play-video demand level").

Although there is no particular limitation to the method of selecting demand-invoking events related to the possible supply event, the following method is employed in this embodiment. Specifically, the demand-level calculating unit 13 calculates a correlation between the log data of the possible supply event and the log data of each of the one or more demand-invoking events. Then, the demand-level calculating unit 13 selects demand-invoking events having log data whose correlation satisfies a predetermined criterion as demand-invoking events related to the possible supply event.

Furthermore, although there is no particular limitation to the method for calculating the play-video demand level by the demand-level calculating unit 13, the following method is employed in this embodiment.

Specifically, as described earlier, there are cases where an event that becomes a possible supply event for some players becomes a demand-invoking event for other players. There is a high possibility that the latter players wish to view a play-video of a possible supply event (a play-video presenting the process of reaching a successful situation). Accordingly, in this embodiment, the demand-level calculating unit 13 increases the play-video demand level as the number of selected demand-invoking events related to the relevant possible supply event increases.

On the other hand, if a play-video of the relevant possible supply event has already been uploaded by another user, there are cases where, for the user for whom the event has become a demand-invoking event, it suffices to view the already uploaded play-video. In this case, it is possible to ascertain that the demand for play-videos of new possible supply events will decrease. In this embodiment, a large number of play-videos about past game plays have been uploaded and stored in the play-video storage unit 15, which will be described later. Furthermore, accesses to the individual play-videos stored in the play-video storage unit 15 are managed by the play-video management unit 16, which will be described later. The demand-level calculating unit 13 obtains the number of accesses to play-videos related to the relevant possible supply event among the play-videos already uploaded in the play-video storage unit 15 and decreases the play-video demand level as the number of accesses becomes larger.

As a specific example of the play-video demand level, a demand score demandScore(V, E) is adopted in this embodiment. The demand score demandScore(V, E) will be described later in detail.

The play-video-recording-recommendation notification unit 14 issues, to a terminal at which a possible supply event having a play-video demand level satisfying a predetermined condition has occurred (the terminal 2-2 in the example in FIG. 1), a notification for prompting recording of a play video of the possible supply event. There is no particular limitation to the predetermined condition. For example, a threshold may be predefined and the play-video demand level exceeding the threshold may be adopted as the condition. There is no particular limitation to the method of notification. A specific example of notification in this embodiment will be described later with reference to FIG. 2.

At a terminal that may send log data of a possible supply event to the server 1 and that can receive a notification for prompting recording of a play-video of the possible supply event (the terminal 2-2 in the example in FIG. 1), a game executing unit 41, a log-data generating unit 42, a log-data saving unit 43, a possible-supply-event detecting unit 44, a log-data sending control unit 45, and a notification-content presenting unit 46 function, as shown in FIG. 1.

The game executing unit 41 executes a predetermined game. The log-data generating unit 42 generates log data when needed while the predetermined game is being executed. The log-data saving unit 43 saves the log data generated when needed as described above. That is, similarly to the terminal 2-1, log data representing the game progress status and the player's status is obtained and saved when needed (in real time). The possible-supply-event detecting unit 44 detects the occurrence of a possible supply event. The log-data sending control unit 45 executes control for sending, to the server 1, log data generated at certain timing while the game is being executed. In this embodiment, the certain timing is the timing at which a possible supply event is detected by the possible-supply-event detecting unit 44. That is, in this embodiment, although log data is generated in real time when needed, the log data is not always sent to the server 1, but log data is sent only when a possible supply event is detected (log data indicating the status of a possible supply event, etc.).

The notification-content presenting unit 46, upon receiving a notification for prompting recording of a play-video of a possible supply event, presents the player with the content of the notification. Although there is no particular limitation to the method of presentation, a method in which an image (e.g., a screen 103, which will be described later) is displayed is adopted in this embodiment. Upon receiving the notification, the player performs a predetermined instruction operation (the operation of pressing the "Yes" button on the screen 103 in the example in FIG. 2, which will be described later) if the player wishes to record a play-video of the possible supply event. Upon receiving the instruction operation, the play-video generating unit 47 generates a play-video of the possible supply event and uploads the play-video to the server 1.

The play-video management unit 16 of the server 1 stores the play-video of the possible supply event, uploaded from the terminal 2-2, in the play-video storage unit 15 in association with the log data obtained earlier by the possible-supply-event obtaining unit 22. That is, the play-video storage unit 15 stores various play-videos (mainly play-videos of possible supply events) about the predetermined game.

Figure 2:
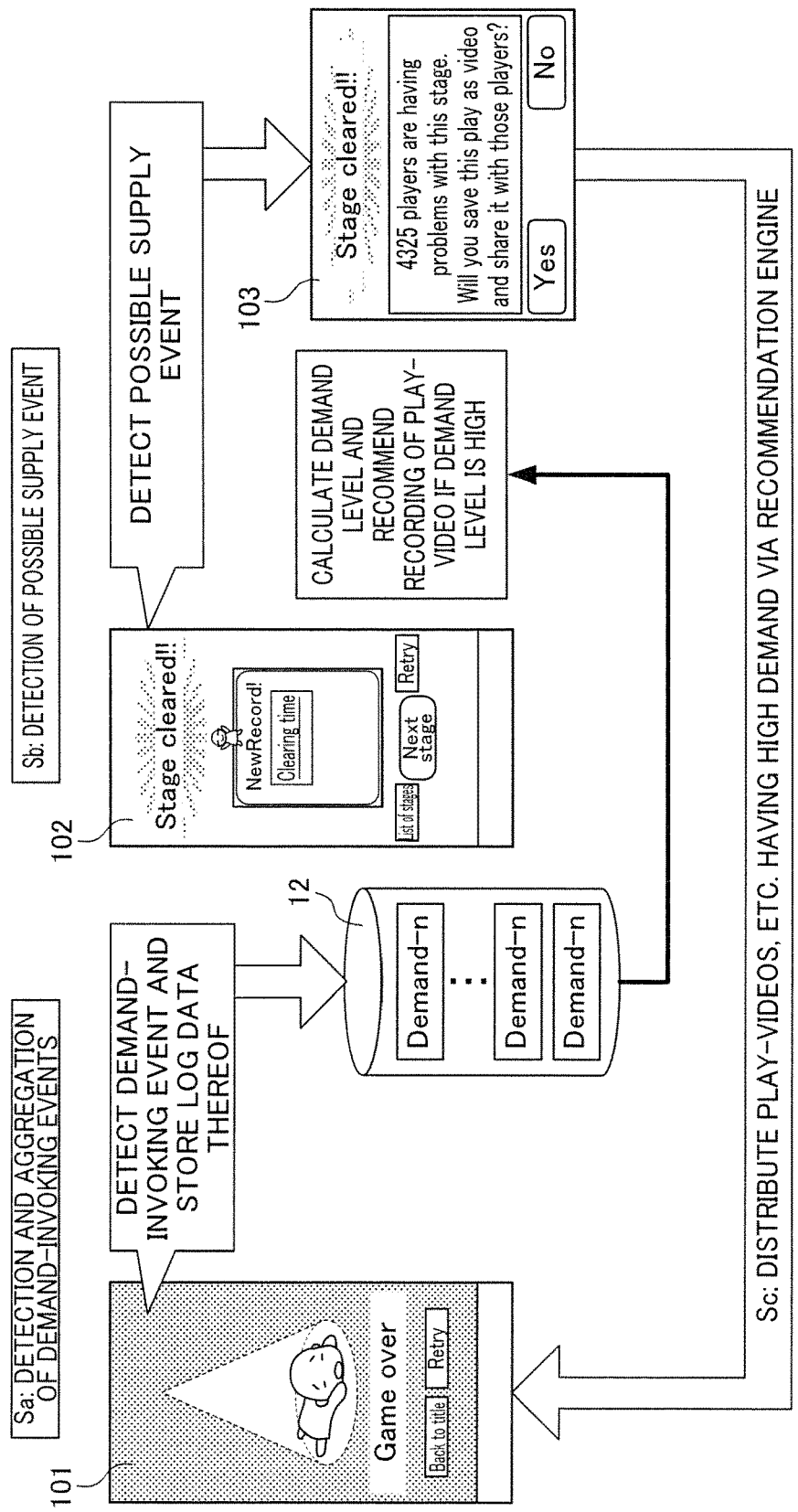
FIG. 2 is a diagram for explaining detection of demand-invoking events and recommendation of a play-video based on detection of a possible supply event at a terminal 2-2 in FIG. 1 in the information processing system in FIG. 1.

The information processing system according to this embodiment will be further described below in detail with reference to FIG. 2 and the subsequent figures. FIG. 2 is a diagram for explaining play-video recommendation based on the detection of a demand-invoking event at the terminal 2-1 in FIG. 1 and the detection of a possible supply event at the terminal 2-2 in FIG. 1.

In step Sa, demand-invoking events are detected and aggregated. Specifically, for example, a screen 101 shows a situation where a player executing a game on the terminal 2-1 experiences a game over in a stage. Failure situations like this (i.e., first events, which are processed as being negative) are detected as demand-invoking events in the stage, and log data of the demand-invoking events is accumulated in the demand-log storage unit 12 of the server 1. Log data of such demand-invoking events is obtained each time a demand-invoking event occurs at any terminal, not only the terminal 2-1, is accumulated in the demand-log storage unit 12, and is aggregated as appropriate on a per-event basis.

In step Sb, possible supply events are detected. Specifically, for example, a screen 102 shows a situation where a player on the terminal 2-2 has cleared the stage. Such a successful situation (i.e., a second event, which is processed as being positive) is detected as a possible supply event in the stage. Then, a play-video demand level for the possible supply event is calculated on the basis of the result of aggregation in step Sa. If the play-video demand level is high (satisfies a predetermined condition), it is estimated that there is potential demand for viewing a play-video of the possible supply event (a play-video presenting the process of clearing the stage), and a screen 103 recommending the player to create and upload the play-video is presented on the terminal 2-2.

In the case where the play-video of the possible supply event is uploaded to the server 1, in step Sc, as a video (play-video) having high demand, the play-video is distributed via a recommendation engine, which is not shown, to the terminal 2-1, etc. at which a demand-invoking event occurred.

As described above, whether to recommend a play-video (present the screen 103) is determined on the basis of the play-video demand level. Thus, the play-video demand level will be described below more specifically. As described above, the play-video demand level for a given possible supply event varies according to the number of demand-invoking events related to the possible supply event. Furthermore, whether a demand-invoking event is related to the possible supply event is determined on the basis of correlation between the individual log data of the possible supply event and the demand-invoking event.

Here, although there is no particular limitation to the method of calculating the correlation, the following method is adopted in this embodiment. Specifically, log data in this embodiment includes a plurality of kinds of attribute information that is obtained during the execution of the game, and is represented by a vector constituted of elements individually corresponding to the plurality of kinds of attribute information, i.e., a vector in a multidimensional vector space. Thus, the demand-level calculating unit 13 calculates, as a correlation, the distance in the multidimensional vector space between the vector representing the log data of the possible supply event and each of the vectors representing the log data of the individual demand-invoking events stored in the demand-log storage unit 12.

Figure 3:
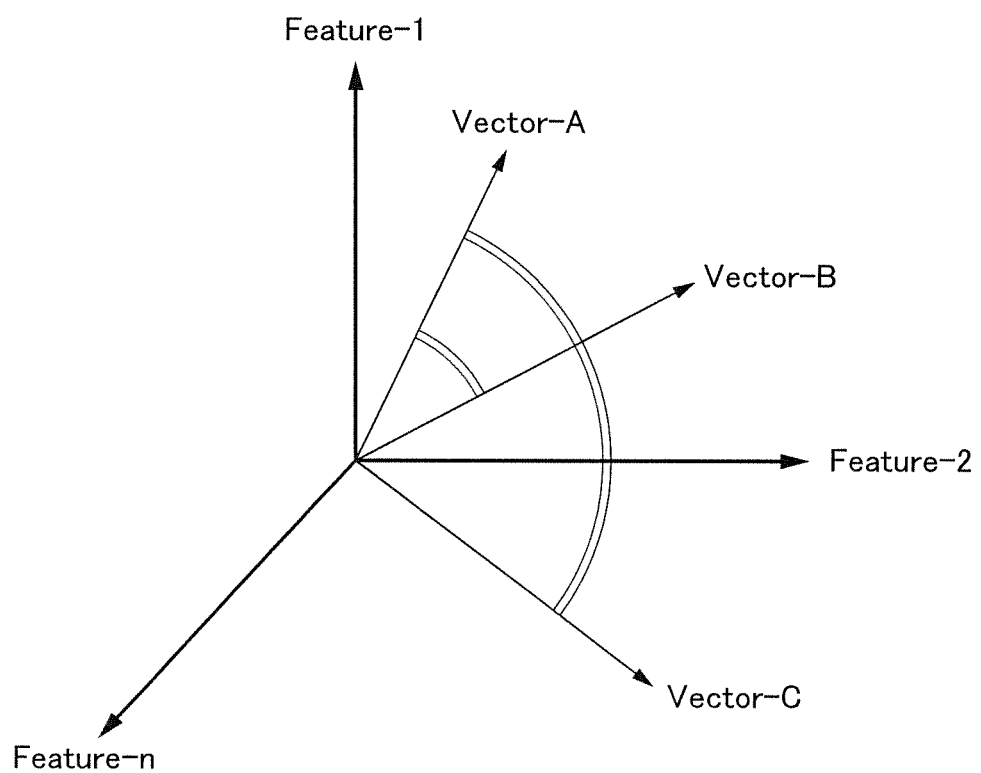
FIG. 3 is a diagram for explaining a method of calculating a correlation between vectors defined in a multidimensional feature space.

The method of calculating the correlation will be described in further detail with reference to FIG. 3. FIG. 3 is a diagram for explaining the method of calculating the correlation between vectors defined in a multidimensional feature space. Although the feature space is represented three-dimensionally for the purpose of illustration, the actual feature space is an n-dimensional (where n is an arbitrary integer greater than or equal to 1) vector space, and each feature axis corresponds to a certain kind of attribute information obtained during the execution of the game, such as an individual item or skill in the game. Thus, the status (log data) of a player in the game can be represented as a vector in the multidimensional vector space. In FIG. 3, the individual statuses (log data) of three players are represented individually by vectors A to C. The distance between such vectors representing the statuses of players, i.e., the inner product of such vectors, is used as correlation. In the example in FIG. 3, vector A is nearer to vector B than to vector C. Thus, the status (log data) of the player corresponding to vector A is more related (similar) to the status (log data) of the player corresponding to vector B than to the status (log data) of the player corresponding to vector C.

Here, each item of log data can be expressed as a combination <P, Q> of log data P representing the status of a player and log data Q representing a progress status in the game.

First, log data P representing the status of a player is an n-dimensional vector representing attribute information of the player in the game, such as the player's level, various parameters, owned items, and skills obtained, as in equation (1) below:

$$P := <p_1, p_2, \ldots, p_n> \quad (1)$$

Here, $p_i$ signifies a real number in the range 0 to 1, corresponding to the i-th attribute in the attribute information of a player in the game. These values should preferably be infinity-norm normalized. For example, in the case of a game in which the maximum level is 100, it is possible to represent Level 1 as 0.01 and Level 100 as 1 by normalizing the values of levels to the maximum value. Furthermore, in the case of a type of item that becomes more valuable as the number of owned items increases, the number of owned items can be represented by normalizing it to the maximum number that can be owned. The number of such attributes may be on the order of hundreds to thousands, depending on the nature of the game. For example, when there are 500 kinds of items and 500 kinds of skills in the game, the value of n becomes at least 1000.

Next, log data Q representing a progress status in the game can be represented as a set of data representing a progress status in the game or locations in the virtual space of the game. For example, in a horizontally scrollable action game, log data Q may include a sequence of a finite number of cell IDs representing positions reached by the player. Furthermore, in the case of an RPG (Role-Playing Game), since the game progress status is represented by using a finite number of scene numbers, log data Q may also include a sequence of such scene numbers. Generally, game software includes built-in flags and IDs for managing the game progress status. Thus, log data Q representing a game progress status can be readily defined by using those kinds of data and can be represented as an m-dimensional vector, as in equation (2) below:

$$Q := \langle q_1, q_2, \ldots, q_m \rangle \quad (2)$$

Here, $q_i$ corresponds to the i-th status among the game progress statuses of the player and takes a value of 1 if it is included in the play-video and takes a value of 0 if it is not included in the play-video.

Hereafter, in order to clearly distinguish log data of a demand-invoking event and log data of a possible supply event, log data of a demand-invoking event will be denoted as $\langle P^-, Q^- \rangle$ and log data of a possible supply event will be denoted as $\langle P^+, Q^+ \rangle$.

Furthermore, in this embodiment, the play-video demand level of a given possible supply event varies according to whether any play-video related to the possible supply event has already been uploaded, as well as the number of demand-invoking events related to the possible supply event. Thus, it is assumed that log data of a given event is also associated with play-videos of the given event, already uploaded in the play-video storage unit 15 (hereinafter referred to as "existing play-videos"). In order to clearly distinguish it from log data of the demand-invoking event and log data of the possible supply event described above, log data associated with such existing play-videos will be denoted as $\langle P, Q \rangle$.

A specific example of calculation of a play-video demand level using the three kinds of log data defined as described above will be described as five steps SA to SE. In the example below, the play-level demand level is calculated as a score. Thus, such a score will hereinafter be referred to as a "demand score."

Step SA is a step of detecting a demand-invoking event. In practice, the game playing statuses on all terminals (not shown) managed by the server 1 are monitored to detect demand-invoking events, although this applies only to the terminal 2-1 in the example in FIG. 1. Each time a demand-invoking event is detected, log data $\langle P^-, Q^- \rangle$ of the demand-invoking event is accumulated in the demand-log storage unit 12.

Step SB is a step of detecting a possible supply event. In practice, the game playing statuses on all terminals (not shown) managed by the server 1, are monitored to detect possible supply events, although this applies only to the terminal 2-2 in the example in FIG. 1. Each time a possible event is detected, log data $\langle P^+, Q^+ \rangle$ of the possible supply event is obtained by the demand-level calculating unit 13. Then, the demand-level calculating unit 13 executes processing in the following steps SC to SE.

Step SC is a step of selecting existing play-videos related to the possible supply event detected in step SB and defining the existing play-videos as a data set V. In the case where existing play-videos related to the possible supply event exist, the demand score should preferably be decreased as the number of accesses to the existing play-videos increases (as overlapping increases).

Thus, in this embodiment, existing play-videos having log data whose correlation with the possible supply event satisfies a predetermined condition (i.e., similar at least to a certain degree) are extracted as existing play-videos related to the possible supply event. Specifically, the demand-level calculating unit 13 calculates a correlation between the log data $\langle P^+, Q^+ \rangle$ of the possible supply event and the log data $\langle P, Q \rangle$ of each existing play-video by calculating the inner product of these log data as in equation (3) below:

$$\text{scoreP}(P^+, P) = \sum_{i=1}^{n} (P_i^+ \cdot P_i) \quad (3)$$

$$\text{scoreQ}(Q^+, Q) = \sum_{i=1}^{m} (Q_i^+ \cdot Q_i)$$

Here, scoreP($P^+$, P) signifies the weight of a correlation between the log data $P^+$ representing the status of the player who has caused the possible supply event to occur and the log data P representing the status of the player who uploaded each existing play-video. It is understood that the statuses of these players become more similar to each other as the weight increases. Furthermore, scoreQ($Q^+$, Q) signifies the weight of a correlation between the log data $Q^+$ representing a game progress status at the time of the possible supply event and the log data Q representing the game progress status in each existing play-video. It is understood that these game progress statuses become more similar to each other as the weight increases.

The demand-level calculating unit 13 calculates a correlation between each existing play-video and the possible supply event according to equation (4) below using a combination of these two weights.

$$\text{rel}(\langle P^+, Q^+ \rangle, \langle P, Q \rangle) := \text{scoreP}(P^+, P) \cdot \text{scoreQ}(Q^+, Q)$$
$$|\text{scoreQ}(Q^+, Q) > t \quad (4)$$

That is, the demand-level calculating unit 13 calculates correlation rel($\langle P^+, Q^+ \rangle$, $\langle P, Q \rangle$) in the form of the product of the above two weights for each existing play-video whose scoreQ($Q^+$, Q) exceeds a predetermined threshold t.

Then, the demand-level calculating unit 13 selects existing play-videos whose correlation rel($P^+$, $Q^+$>, <P, Q>) exceeds a predetermined threshold and defines the set of selected existing play-videos as a data set V.

Step SD is a step of selecting demand-invoking events related to the possible supply event detected in step SB and defining the demand-invoking events as a data set E. It is presumed that the demand score increases as the number of demand-invoking events related to the possible supply event increases.

Thus, in this embodiment, demand-invoking events having log data whose correlation with the possible supply event satisfies a predetermined condition (i.e., similar at least to a certain degree) are extracted as demand-invoking events related to the possible supply event. Specifically, the demand-level calculating unit 13 calculates a correlation between the log data <$P^+$, $Q^+$> of the possible supply event and the log data <$P^-$, $Q^-$> of each demand-invoking event according to an equation similar to equation (3) given earlier. Then, the demand-level calculating unit 13 calculates a correlation between each demand-invoking event and the possible supply event according to equation (5) below:

$$\text{rel}(<P^+,Q^+>,<P^-,Q^->) := \text{score}P(P^+,P^-) \cdot \text{score}Q(Q^+, Q^-) | \text{score}Q(Q^+,Q^-) > t \qquad (5)$$

That is, the demand-level calculating unit 13 calculates correlation rel(<$P^+$, $Q^+$>, <$P^-$, $Q^-$>) for each demand-invoking event whose scoreQ($Q^+$, $Q^-$) exceeds a predetermined threshold t.

Then, the demand-level calculating unit 13 selects demand-invoking events whose correlation rel(<$P^+$, $Q^+$>, <$P^-$, $Q^-$>) exceeds a predetermined threshold and defines the set of selected demand-invoking events as a data set E.

Step SE is a step of calculating a demand score from the data set V and the data set E. As described above, the demand score should preferably be increased as the number of data included in the data set E, i.e., the number of demand-invoking events related to the possible supply event, increases. On the other hand, the demand score should preferably be decreased as the number of accesses to the data included in the data set V, i.e., the existing play-videos related to the possible supply event, increases. Thus, the demand score (V, E) in this embodiment is calculated according to equation (6) below. In equation (6), rel($E_j$) is a value calculated for the j-th demand-invoking event $E_j$ in the data set E.

$$\text{demandScore}(V, E) := \frac{\sum_{j=1}^{m}(\text{rel}(E_j))}{\sum_{i=1}^{n}(\text{pageview}(V_i) \cdot \text{feedback}(V_{ij}))} \qquad (6)$$

Here, pageview($V_i$) and feedback($V_i$) signify the number of page views of the i-th play-video in the data set V and the number of times social-media feedback has been given for the play-video, respectively. That is, in this embodiment, the number of views (the number of page views) and the number of evaluations (the number of social-media feedbacks) are adopted as the number of accesses to existing play-videos.

In the case where the demand score calculated according to equation (6) above satisfies a predetermined condition (e.g., exceeds a predetermined threshold), the play-video-recording-recommendation notification unit 14 issues a notification to prompt the player on the terminal 2-2, who has caused the possible supply event to occur, to record and upload a play-video of the possible supply event. That is, in the example in FIG. 2, the screen 103 is displayed on the terminal 2-2.

Next, the relationship in processing that is executed between the server 1 and the terminal 2-2, at which a possible supply event has occurred, will be explained with reference to FIG. 4. Such processing will hereinafter be referred to as "recording recommendation processing" since recording of a play-video of a possible supply event is recommended. FIG. 4 is a flowchart for explaining the flow of the recording recommendation processing according to this embodiment.

In step S1, the game executing unit 41 of the terminal 2-2 executes the game.

In step S2, the log-data generating unit 42 generates log data when needed as the game progresses and saves the log data in the log-data saving unit 43.

In step S3, the possible-supply-event detecting unit 44 determines whether a possible supply event has occurred.

In the case where a possible supply event has not occurred, the determination in step S3 results in NO, and the processing proceeds to step S9.

In step S9, the game executing unit 41 determines whether the execution of the game has ended. In the case where the execution of the game has ended, the determination in step S9 results in YES, and the recording recommendation processing is terminated. On the other hand, in the case where the game is being continued, the determination in step S9 results in NO, and the processing returns to step S2. That is, in the case where the game is being continued, loop processing through step S2, No in step S3, and No in step S9 is repeated and log data is continuously generated when needed until a possible supply event occurs. However, the log data is not sent to the server 1.

During this period, in step S11, the possible-supply-event obtaining unit 22 of the server 1 determines whether possible-supply log data has been received. In the case where possible-supply log data has not been received, the determination in step S11 results in NO, and the processing proceeds to step S17.

In step S17, the server 1 determines whether termination of processing has been instructed. There is no particular limitation to the method of instructing termination of processing. For example, shutdown of the server 1 may be adopted. In the case where termination of processing has been instructed, the determination in step S17 results in YES, and the recording recommendation processing is terminated. On the other hand, in the case where termination of processing has not been instructed, the determination in step S17 results in NO, and the processing returns to step S11. That is, if termination of processing has not been instructed, loop processing through No in step S11 and No in step S17 is repeated, and the server 1 keeps waiting until a possible supply event is received.

When a possible supply event occurs in the game being executed on the terminal 2-2, the determination in step S3 results in YES, and the processing proceeds to step S4. In step S4, the log-data sending control unit 45 of the terminal 2-2 sends the log data saved in the log-data saving unit 43 to the server 1 as log data of the possible supply event.

In this case, on the server 1, the determination in step S11 results in YES, and the processing proceeds to step S12. In step S12, the demand-level calculating unit 13 of the server 1 calculates a play-video demand level. In this embodiment, the processing in steps SC to SE, described earlier, is executed to calculate the demand score demandScore(V, E) expressed in equation (6) as a play-video demand level.

In step S13, the play-video-recording-recommendation notification unit 14 determines whether the play-video demand level satisfies a predetermined condition. Here, although there is no particular limitation to the predetermined condition, since the demand score is adopted as the play-video demand level in this embodiment, what is assumed to be adopted is the condition that the demand score exceeds a predetermined threshold. Thus, in the case where the demand score does not exceed the predetermined threshold, the determination in step S13 results in NO, and the processing proceeds to step S17. That is, in the case where the termination of processing has not been instructed, the server 1 keeps waiting until the next possible-supply log data is received. On the other hand, in the case where the demand score exceeds the predetermined threshold, the determination in step S13 results in YES, and the processing proceeds to step S14.

In step S14, the play-video-recording-recommendation notification unit 14 of the server 1 issues a notification for prompting recording of a play-video of the possible supply event to the terminal 2-2, at which the possible supply event has occurred. That is, in step S6, the notification-content presenting unit 46 of the terminal 2-2 presents the player with the content of the notification. Although there is no particular limitation to the method of presenting the notification, in the method adopted in this embodiment, the screen 103 in FIG. 2 is displayed on the terminal 2-2.

In step S7, the play-video generating unit 47 of the terminal 2-2 determines whether recording has been instructed. In this embodiment, recording is instructed by pressing the "Yes" button on the screen 103 in FIG. 2. Thus, in the case where the "Yes" button on the screen 103 in FIG. 2 has not been pressed, the determination in step S7 results in NO, and the processing proceeds to step S9. That is, in this case, although recording of a play-video is recommended, the player does not accept the recommendation, and thus a play-video of the possible supply event is not recorded. In this case, when the game progresses further, log data is generated when needed, and a new possible supply event occurs, the processing in step S4 and the subsequent steps described above is executed.

On the other hand, when the "Yes" button on the screen 103 in FIG. 2 is pressed, the determination in step S7 results in YES, and the processing proceeds to step S8. In step S8, the play-video generating unit 47 records a play-video of the possible supply event and uploads the play-video to the server 1.

During this period, in step S15, the play-video management unit 16 of the server 1 determines whether a play-video has been uploaded. Although there is no particular limitation to the method of determination, for example, in the method adopted in this embodiment, it is determined that a play-video has not been uploaded if no play-video is uploaded during a predetermined length of time. In the case where it is determined that a play-video has not been uploaded, i.e., when the determination in step S15 results in NO, the processing proceeds to step S17. That is, the server 1 keeps waiting.

On the other hand, in the case where a play-video has been uploaded, the determination in step S15 results in YES, and the processing proceeds to step S16. In step S16, the play-video management unit 16 records the uploaded play-video of the possible supply event in the play-video storage unit 15. The play-video recorded in the play-video storage unit 15 becomes an existing play-video for other possible supply events that may occur later. Thus, the play-video management unit 16 manages the log data of the possible supply event, received in the processing in step S11 (YES), as log data in association with the play-video. After the processing in step S16 is finished, the processing proceeds to step S17. That is, the server 1 keeps waiting.

The information processing system according to the above-described embodiment can be applied to games in various genres since it makes it possible to aggregate the demand for a play-video and to recommend creation of a play-video in accordance with the positive and negative kinds of various events (beating/not beating an enemy, clearing/not clearing a stage, beating an enemy with a difficult killer technique/not being able to use a killer technique, etc.).

The information processing system according to this embodiment makes it possible to automatically detect scenes or situations having high potential demand and to strongly motivate players who have played successfully in such scenes to create play-videos. Thus, the present invention provides players who create videos with opportunities for their videos being viewed by a large number of users and serves to teach players of the game new ways of playing the game.

Specifically, the information processing system according to the embodiment adopts a method of recommending a timing for a player to capture a play-video in a scene or situation for which it is estimated that there is high demand from other players. Thus, in the information processing system according to the embodiment, for example, a situation where a novice is experiencing a dead end in a specific stage, a situation where a novice cannot beat a specific boss, etc. (first events, which are processed as being negative, i.e., demand-invoking events) are aggregated as the demand for play-videos. Then, when a player plays successfully to solve such a situation (a second event, which is processed as being positive, i.e., a possible supply event), the player is notified that there is high demand for a play-video of the play and is recommended to save and upload (share) the play as a play-video. Accordingly, it becomes possible to automatically match demand and supply of play-videos and to strongly motivate players to create play-videos in scenes or situations having a high potential demand. That is, the level of demand that will occur when a play-video is posted is calculated in real time in accordance with the kind of event executed by a player in the game, and the player is recommended to capture only scenes having high demand in a pin-point fashion.

More specifically, terminals that execute a game, such as the terminals 2-1 and 2-2, are special game terminals in some cases but are more often terminals that are not for games only, such as smartphones. Most users (players) who play games on terminals that are not for games only are casual users. For such casual users, it is not apparent what kinds of play-videos are desired for other users, i.e., have demand from other users. Thus, it has not hitherto been easy for casual users to create videos that satisfy the demand from other users in a pin-point fashion. Furthermore, the anxiety that their play-videos may not be appreciated by other users has been a high mental hurdle that hinders casual users from creating and posting play-videos.

At video sites such as YouTube (registered trademark), there is a tendency for popular videos to be listed at high ranks, and thus there is only a low possibility that videos posted by casual users are viewed by other casual users. Furthermore, existing popular videos and official videos are edited in sophisticated manners, and casual users will not be able to casually create such videos. Therefore, with existing technologies, which lack a mechanism for presenting casual users with suitable timings for uploading videos and suitable kinds of video content to be uploaded, it is difficult to continuously motivate general users to create play-videos.

Accordingly, games incorporating toolkits for creating play-videos will not spread unless such casual users are given motivation for creating play-videos. In particular, it will presumably contribute to the spread of games incorporating toolkits for creating play-videos to give motivation for creating play-videos in a pin-point fashion, such as an interesting play, a beautiful play, or a play in which a player elegantly beats a boss, rather than a video created by capturing the game play during the entire play time. That is, it is important to realize a mechanism for matching demand for a large variety of play-videos from a large variety of players with the content of play-videos created by casual users. Such a matching mechanism is realized by the information processing system according to the embodiment. That is, by adopting the information processing system according to the embodiment, it becomes possible to notify players that there is a high demand for their "present plays" and to motivate them to upload videos. This makes it possible to readily establish a cycle of sharing and viewing play-videos such that the potential demand for play-videos will be satisfied quickly. This will presumably contribute to the spread of games having a function for creating play-videos.

Furthermore, the information processing system according to the embodiment also has the following advantages.

For example, an advantage is afforded in that potential players who may create play-videos can be discovered. That is, even players who were not willing to capture play-videos may become aware that other players may actually benefit from viewing their plays. This serves to discover players who newly start creating videos. Since creating play-videos will enhance commitment to the game, those players become more likely to continue the game.

Furthermore, an advantage is also afforded with respect to compatibility. That is, the function for recommending creation of a play-video can be implemented together with any SDK (Software Development Kit) that allows recording any game video. That is, it becomes possible to construct an information processing system without depending on any specific method of recording a play-video.

Furthermore, an advantage is also afforded with respect to originality. That is, the recommendation for creating a play-video in accordance with a game play is highly original.

Furthermore, for example, an advantage is also afforded with respect to versatility. The information processing system according to the embodiment can be applied to any game title that can be suspended in the course of playing. Furthermore, the play-video recording recommendation described above does not depend on any specific game genre and is applicable to a wide range of game genres, including action games, RPGs, shooting games, and simulation games.

Although an embodiment of the present invention has been described above, it is to be noted that the present invention is not limited to the above-described embodiment and that modifications, improvements, etc. within a scope in which it is possible to achieve the object of the present invention are encompassed in the present invention.

Although event log data is represented as vectors in a multidimensional vector space in the above-described embodiment, there is no particular limitation to this representation. That is, log data need not necessarily be represented as such vectors, and various representations may be chosen, such as histograms, nodes in a tree structure, or nodes in a network graph. In the case of histogram representation, similarity between two histograms can be calculated by using a distance criterion called histogram intersection or a distance criterion called the earth mover's distance. The distance between two nodes in a tree structure or a network graph structure can be calculated in terms of the number of hops. In the present invention, it is possible to employ an arbitrary data structure that can give a meaningful distance criterion between two distributed data.

Furthermore, for example, although play-videos are stored in the play-video storage unit 15 of the server 1 in the above-described embodiment, there is no particular limitation to this storage location, and play-videos may be stored in a location other than the server 1 (e.g., video storage at YouTube (registered trademark)). That is, play-videos need not necessarily be uploaded to the server 1, and play-videos may be uploaded to a different location and managed at the server 1 on the basis of location data thereof (e.g., URLs (Uniform Resource Locators)). That is, when a play-video is uploaded from the terminal 2-2, instead of uploading the play-video to the server 1, the play-video may be uploaded to YouTube (registered trademark), etc., in which case a URL of the upload destination is obtained and only the URL is sent to the server 1.

In other words, an information processing system according to the present invention may be embodied in various forms configured as described below, including the information processing system according to the above-described embodiment in FIG. 1. Specifically, an information processing system according to the present invention is an information processing system including a plurality of terminals that can execute a game and also including a server. The server (e.g., the server 1 in FIG. 1) includes: an event obtaining means (e.g., the event obtaining unit 11 in FIG. 1) that obtains log data of each first event (e.g., the demand-invoking event described earlier), processed as being negative in the game, from a terminal (e.g., the terminal 2-1 in FIG. 1) at which the first event has occurred among the plurality of terminals and that obtains log data of each second event (e.g., the possible supply event described earlier), processed as being positive in the game, from a terminal (e.g., the terminal 2-2 in FIG. 1) at which the second event has occurred among the plurality of terminals; a level calculating means (e.g., the demand-level calculating unit 13 in FIG. 1) that selects a first event or events related to each second event from one or more first events on the basis of the individual log data obtained and that calculates a level of potential demand (e.g., the demand score expressed in equation (6) given earlier) for an image related to the second event on the basis of the result of selection; and a notifying means (e.g., the play-video-recording-recommendation notification unit 14 in FIG. 1) that issues a notification to each terminal at which a second event whose demand level satisfies a predetermined condition has occurred to prompt recording of a video related to the second event. At least one or more of the plurality of terminals (e.g., the terminals 2-1 and 2-2 in FIG. 1) include: an event detecting means (e.g., the demand-invoking-event detecting unit 34 and the possible-supply-event detecting unit 44 in FIG. 1) that detects first events and second events while the game is being executed; a log providing means (e.g., the log-data sending control unit 35 and the log-data sending control unit 45 in FIG. 1) that provides the server with individual log data of the first events and second events; and a presenting means (e.g., the notification-content presenting unit 46) that presents the content of the notification from the server.

This makes it possible to notify a player executing a game that there is a demand for viewing a play-video created by recording a game play, thereby motivating the player to upload the play-video data.

The series of processing steps described above may be executed either by hardware or by software. In other words, the functional configuration in FIG. 1 is only an example, and there is no particular limitation to this example. That is, it suffices that an information processing system be provided with functions that enable the execution of the above-described series of processing steps as a whole, and the configuration of functional blocks for implementing the functions is not particularly limited to the example in FIG. 1. Furthermore, the locations of the functional blocks are not particularly limited to those in FIG. 1 and may be arbitrarily set. For example, the functional blocks of the server 1 may be transferred to the terminal 2-2, etc., and conversely, the functional blocks of the terminal 2-2 may be transferred to the server 1, etc. Furthermore, each functional block may be implemented by hardware alone, by software alone, or by a combination of hardware and software.

In a case where the series of processing steps is executed by software, a program constituting the software is installed on a computer, etc. via a network or from a recording medium. The computer may be a computer embedded in special hardware. Alternatively, the computer may be a computer that can execute various functions when various programs are installed thereon, such as a server or a general-purpose smartphone or personal computer.

A recording medium including such a program is implemented by a removable medium (not shown) that is distributed separately from the main unit of the apparatus in order to provide the program to a user, a recording medium that is provided to a user as embedded in the main unit of the apparatus, etc.

In this specification, steps dictated in the program recorded on the recording medium may include not only processing that is executed sequentially in order of time but also processing that is not executed sequentially in order of time but is executed in parallel or individually. Furthermore, in this specification, the term "system" should be construed to mean an overall apparatus constituted of a plurality of devices, a plurality of means, etc.

EXPLANATION OF REFERENCE NUMERALS

1 Server
2-1, 2-2 Terminals
11 Event obtaining unit
12 Demand-log storage unit
13 Demand-level calculating unit
14 Play-video-recording-recommendation notification unit
15 Play-video storage unit
16 Play-video management unit
21 Demand-invoking-event obtaining unit
22 Possible-supply-event obtaining unit
31 Game executing unit
32 Log-data generating unit
33 Log-data saving unit
34 Demand-invoking-event detecting unit
35 Log-data sending control unit
41 Game executing unit
42 Log-data generating unit
43 Log-data saving unit
44 Possible-supply-event detecting unit
45 Log-data sending control unit
46 Notification-content presenting unit
47 Play-video generating unit

The invention claimed is:

1. An information processing system comprising a plurality of terminals that can execute a game and also comprising a server,
wherein the server includes:
an event obtaining unit that obtains log data of each first event, processed as being negative in the game, from a terminal at which the first event has occurred among the plurality of terminals and that obtains log data of each second event, processed as being positive in the game, from a terminal at which the second event has occurred among the plurality of terminals;
a level calculating unit that selects a first event or events related to each second event from one or more first events on the basis of the individual log data obtained and that calculates a level of potential demand for an image related to the second event on the basis of the result of selection; and
a notifying unit that issues a notification to each terminal at which a second event whose demand level satisfies a predetermined condition has occurred to prompt recording of a video related to the second event,
wherein at least one or more of the plurality of terminals include:
an event detecting unit that detects first events and second events while the game is being executed;
a log providing unit that provides the server with individual log data of the first events and second events; and
a presenting unit that presents the content of the notification from the server.

2. A server that communicates with a plurality of terminals that can execute a game, the server comprising:
an event obtaining unit that obtains log data of each first event, processed as being negative in the game, from a terminal at which the first event has occurred among the plurality of terminals and that obtains log data of each second event, processed as being positive in the game, from a terminal at which the second event has occurred among the plurality of terminals;
a level calculating unit that selects a first event or events related to each second event from one or more first events on the basis of the individual log data obtained and that calculates a level of potential demand for a video related to the second event on the basis of the result of selection; and
a notifying unit that issues a notification to each terminal at which a second event whose demand level satisfies a predetermined condition has occurred to prompt recording of a video related to the second event.

3. The server according to claim 2,
wherein the log data includes one or more kinds of attribute information that is obtained while the game is being executed,
wherein the level calculating unit calculates correlation between the log data of the second event and each of the log data of the first events, and
wherein the level calculating unit selects a first event or events having log data with the correlation satisfying a predetermined condition as a first event or events related to the second event.

4. The server according to claim 3,
wherein the log data includes log data representing a progress status of the game and log data representing a player's status in the game.

5. The server according to claim 3,
wherein the log data is represented by a vector in a multidimensional vector space, and
wherein the level calculating unit calculates, as the correlation, the distance in the multidimensional space between a vector representing the log data of the second event and each of vectors representing the log data of the one or more first events.

6. The server according to any one of claim 2, wherein the level calculating unit increases the level of potential demand for a video related to the second event as the number of first events selected as being related to the second event increases.

7. The server according to any one of claim 2, further comprising a management unit that manages video or videos related to certain events of the game executed in the past or location data of the video or videos,
wherein the level calculating unit obtains the number of accesses to video or videos related to the second event among the video or videos managed by the management unit or the video or videos identified on the basis of the location data, and
wherein the level calculating unit decreases the level of potential demand for a video related to the second event as the number of accesses increases.

8. A non-transitory computer-readable medium storing a program for causing a computer that executes control, including communication with a plurality of terminals that can execute a game, to execute control processing comprising:
an event obtaining step of obtaining log data of each first event, processed as being negative in the game, from a terminal at which the first event has occurred among the plurality of terminals and obtaining log data of each second event, processed as being positive in the game, from a terminal at which the second event has occurred among the plurality of terminals;
a level calculating step of selecting a first event or events related to each second event from one or more first events on the basis of the individual log data obtained and calculating a level of potential demand for an image related to the second event on the basis of the result of selection; and
a notifying step of issuing a notification to each terminal at which a second event whose demand level satisfies a predetermined condition has occurred to prompt recording of a video related to the second event.

9. A non-transitory computer-readable medium storing a program for causing a computer that controls a terminal that communicates with a server to execute control processing, the server having:
an event obtaining function of obtaining log data of each first event, processed as being negative in the game, from a terminal at which the first event has occurred among the plurality of terminals and obtaining log data of each second event, processed as being positive in the game, from a terminal at which the second event has occurred among the plurality of terminals;
a notifying function of selecting first event or events related to each second event from one or more first events on the basis of the individual log data obtained, calculating a level of potential demand for an image related to the second event on the basis of the result of selection, and issuing a notification to each terminal at which a second event whose demand level satisfies a predetermined condition has occurred to prompt recording of a video related to the second event, and
the control processing comprising:
an event detecting step of detecting first events and second events while the game is being executed;
a log providing step of providing the server with individual log data of the first events and second events; and
a presenting step of presenting the content of the notification from the server.

10. An information processing method executed by an information processing apparatus that communicates with a server,
the server having:
an event obtaining function of obtaining log data of each first event, processed as being negative in the game, from a terminal at which the first event has occurred among the plurality of terminals and obtaining log data of each second event, processed as being positive in the game, from a terminal at which the second event has occurred among the plurality of terminals;
a notifying function of selecting first event or events related to each second event from one or more first events on the basis of the individual log data obtained, calculating a level of potential demand for an image related to the second event on the basis of the result of selection, and issuing a notification to each terminal at which a second event whose demand level satisfies a predetermined condition has occurred to prompt recording of a video related to the second event, and
the information processing method comprising:
an event detecting step of detecting first events and second events while the game is being executed;
a log providing step of providing the server with individual log data of the first events and second events; and
a presenting step of presenting the content of the notification from the server.

* * * * *